United States Patent
Endoh

[19]
[11] Patent Number: 6,088,531
[45] Date of Patent: Jul. 11, 2000

[54] WATER-RESISTANT PUSH BUTTON SWITCH

[75] Inventor: Yasuhiko Endoh, Tokyo, Japan

[73] Assignee: Asahi Kogaku Kogyo Kabushiki Kaisha, Tokyo, Japan

[21] Appl. No.: 09/241,431

[22] Filed: Feb. 2, 1999

[30] Foreign Application Priority Data

Feb. 4, 1998  [JP]  Japan ................................. 10-023384

[51] Int. Cl.[7] .................................................. G03B 17/24
[52] U.S. Cl. ............................................ 396/29; 396/543
[58] Field of Search ............................... 396/25, 27, 29, 396/543

[56] References Cited

U.S. PATENT DOCUMENTS 4,839,483   6/1989   Doyle .................................. 200/302.1
5,897,224   4/1999   Freund .................................... 396/25

*Primary Examiner*—David M. Gray
*Attorney, Agent, or Firm*—Greenblum & Bernstein, P.L.C.

[57] ABSTRACT

A water-resistant push button switch of a water-resistant apparatus, includes: an opening formed on a body wall of the water-resistant apparatus; a water-resistant elastic member for preventing water from entering inside the water-resistant apparatus through the opening; an operational member positioned on an outer side of the water-resistant elastic member so as to be movable with respect to the body wall; an intermediate member positioned on an inner side of the water-resistant elastic member so as to be movable with respect to the body wall, the intermediate member being pressed by the operational member via the water-resistant elastic member when the operational member is depressed; and a switch which is operated by being pressed by the intermediate member via the water-resistant elastic member upon the operational member being pressed.

29 Claims, 5 Drawing Sheets

WATER-RESISTANT PUSH BUTTON SWITCH

BACKGROUND OF THE INVENTION

1. Field of the Invention

The present invention relates to a water-resistant push button switch having a watertight structure.

2. Description of the Related Art

A water-resistant push button switch (such as a shutter release button of a water-resistant camera) which can be operated by a push of a fingertip and constructed in a watertight fashion to prevent water, moisture, dust, etc. from entering inside the device (on which the push button switch is provided) is well-known. To realize such a water-resistant pushbutton switch, a type of water-resistant push button switch is known having a structure in which a rubber sheet is simply attached to the top and around a push button in a watertight fashion. In this type of water-resistant push button switch, the rubber sheet is depressed by a fingertip to press the push button. As a result, the push button does not posses a very good sense of touch, being difficult to perceive a tangible click when the user depresses the push button by their fingertip to turn the switch ON or OFF. Hence, there has been a strong demand for improving the operation of such a water-resistant push button switch. Furthermore, the rubber sheet, attached onto the body of the device, generally needs to be thick so as not to be easily torn or damaged, which further deteriorates the sense of touch of the push button. In the case where the rubber sheet is attached to the push button by an adhesive, the adhesive may protrude out of the rim of the rubber sheet, which spoils the appearance of the device. The rubber sheet may possibly peel off at an adhesive part thereof as a result of a long period of use of the push button switch. In general it is difficult to assemble not only such type of water-resistant push button switch using the rubber sheet, but also any other conventional type of water-resistant push button switches.

SUMMARY OF THE INVENTION

The primary object of the present invention is to provide a water-resistant push button switch which can be easily operated and assembled and which substantially maintains good watertight performance.

To achieve the object mentioned above, according to an aspect of the present invention, there is provided a water-resistant push button switch of a water-resistant apparatus, including: an opening formed on a body wall of the water-resistant apparatus; a water-resistant elastic member for preventing water from entering inside the water-resistant apparatus through the opening; an operational member positioned on an outer side of the water-resistant elastic member so as to be movable with respect to the body wall; an intermediate member positioned on an inner side of the water-resistant elastic member so as to be movable with respect to the body wall, the intermediate member being pressed by the operational member via the water-resistant elastic member when the operational member is depressed; and a switch which is operated by being pressed by the intermediate member via the water-resistant elastic member upon the operational member being pressed.

Preferably, the operational member comprises a slot through which water can enter and be discharged from a space defined between the operational member and the water-resistant elastic member.

In an embodiment, the water-resistant elastic member, the operational member and the intermediate member are all positioned in the opening and supported by the body wall via a cylindrical base member provided separate from the body wall.

Preferably, the base member includes a stepped portion formed on an inner peripheral surface of the base member, and a circumferential edge of the water-resistant elastic member being positioned on the stepped portion.

Preferably, a holding member fixed to the base member is further provided, with the circumferential edge of the water-resistant elastic member being held between the stepped portion of the base member and the holding member.

Preferably, the holding member includes a cylindrical outer peripheral surface which corresponds to a cylindrical inner peripheral surface of the base member so that the holding member is fitted into the base member when the holding member is fixed to the base member.

Preferably, the stepped portion or the holding member includes an inclined annular surface which is inclined with respect to an axial direction of the base member. To this end, it is preferable that the inclined annular surface is inclined in a deforming direction of the circumferential edge of the water-resistant elastic member to thereby bring the circumferential edge into pressing contact with an inner peripheral surface of the base member when the circumferential edge is held between the inclined annular surface and the holding member.

Preferably, the holding member includes a cylindrical wall provided with a plurality of engaging projections which project radially from an outer peripheral surface of the cylindrical wall, an outer diameter of the cylindrical wall corresponding to an inner diameter of the cylindrical base member, and the base member includes a cylindrical wall provided with a plurality of slots with which the plurality of engaging projections are respectively engaged when the holding member is fixed to the base member. The plurality of slots can be each substantially L-shaped.

To fix the holding member to the base member, the holding member can include a cylindrical wall provided on an outer peripheral surface thereof with a male screw thread, an outer diameter of the cylindrical wall corresponding to an inner diameter of the cylindrical base member, and the base member can include a cylindrical wall provided on an inner peripheral surface thereof with a female screw thread which is engaged with the male screw thread when the holding member is fixed to the base member.

Preferably, the base member, the water-resistant elastic member, the operational member and the intermediate member are assembled as a unit which is secured to the body wall to be positioned in the opening in a watertight fashion.

In an embodiment, the water-resistant elastic member and the operational member are positioned in the opening and supported directly by the body wall.

Preferably, an inner peripheral surface of the opening of the body wall includes a stepped portion, a circumferential edge of the water-resistant elastic member being positioned on the stepped portion.

Preferably, a holding member fixed to the body wall is further provided with the circumferential edge of the water-resistant elastic member being held between the stepped portion and the holding member.

Preferably, the holding member includes a cylindrical outer peripheral surface which corresponds to the inner peripheral surface of the opening wherein the holding member is fitted in the opening when the holding member is fixed to the body wall.

Preferably, the stepped portion or the holding member includes an inclined annular surface which is inclined with respect to an axial direction of the opening. To this end, it is preferable that the inclined annular surface is inclined in a deforming direction of the circumferential edge of the water-resistant elastic member to thereby bring the circumferential edge into pressing contact with the inner peripheral surface of the opening when the circumferential edge is held between the inclined annular surface and the holding member.

Preferably, the holding member includes a cylindrical wall provided with a plurality of engaging projections which project radially from an outer peripheral surface of the cylindrical wall, an outer diameter of the cylindrical wall corresponding to a diameter of the opening, and the body wall includes a plurality of slots with which the plurality of engaging projections are respectively engaged when the holding member is fixed to the body wall. The plurality of slots can be each substantially L-shaped. It is preferable that the body wall includes a cylindrical wall which is formed around the opening to extend inwardly, and the plurality of slots are formed on the cylindrical wall.

The holding member can include a cylindrical wall provided on an outer peripheral surface thereof with a male screw thread, an outer diameter of the cylindrical wall corresponding to a diameter of the opening, and the body wall can include a female screw thread formed on an inner peripheral surface of the opening, so that the male screw thread is engaged with the female screw thread when the holding member is fixed to the body wall.

Preferably, the water-resistant elastic member includes a circumferential edge which is thicker than an inner portion thereof.

Preferably, the water-resistant elastic member is formed to have a dome shape which bulges towards the operational member when the operational member is not depressed.

Preferably, the holding member includes a side wall and a bottom wall connected to the side wall, and the bottom wall includes: a guide opening in which a corresponding portion of the intermediate member is inserted to be guided in an axial direction of the guide opening; and at least one through hole for allowing air to come into and out of a space defined between the water-resistant elastic member and the bottom wall.

Preferably, there is provided a plurality of through holes, a corresponding plurality of engaging projections formed on a tool being respectively inserted into the plurality of through holes when the holding member is fixed to the base member.

Preferably, the water-resistant apparatus is a water-resistant camera, and the switch includes a release switch of the water-resistant camera. Furthermore, the switch further can include a photometering switch of the water-resistant camera.

According to another aspect of the present invention there is provided a water-resistant push button switch of a water-resistant apparatus, including: an opening formed on a body wall of the water-resistant apparatus; an operational member positioned in the opening to be movable in an axial direction of the opening with respect to the body wall; an intermediate member positioned below the operational member to be movable in the axial direction of the opening with respect to the body wall; a water-resistant diaphragm, positioned between the operational member and the intermediate member, for preventing water from entering inside the water-resistant apparatus through the opening; and a switch which is positioned in the water-resistant apparatus and is operated by being pressed by the intermediate member via the water-resistant diaphragm upon the operational member being pressed, wherein the operational member, the water-resistant diaphragm and the intermediate member are coaxially arranged so as to move together in the axial direction of the opening when the operational member is depressed.

The present disclosure relates to subject matter contained in Japanese Patent Application No.10-23384 (filed on Feb. 4, 1998) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
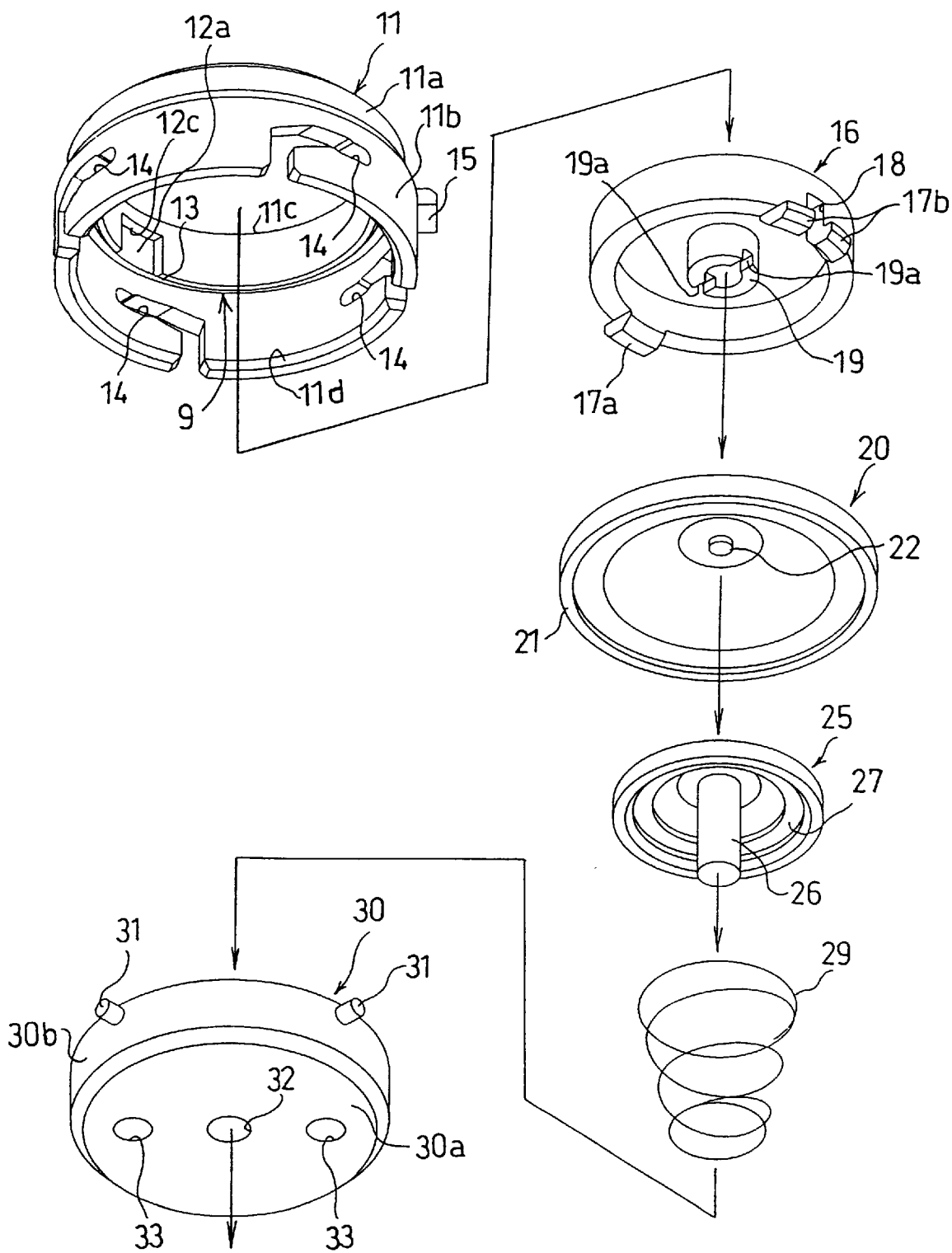
FIG. 1 is an exploded perspective view of a water-resistant push button unit to which the present invention is applied.
Figure 2:
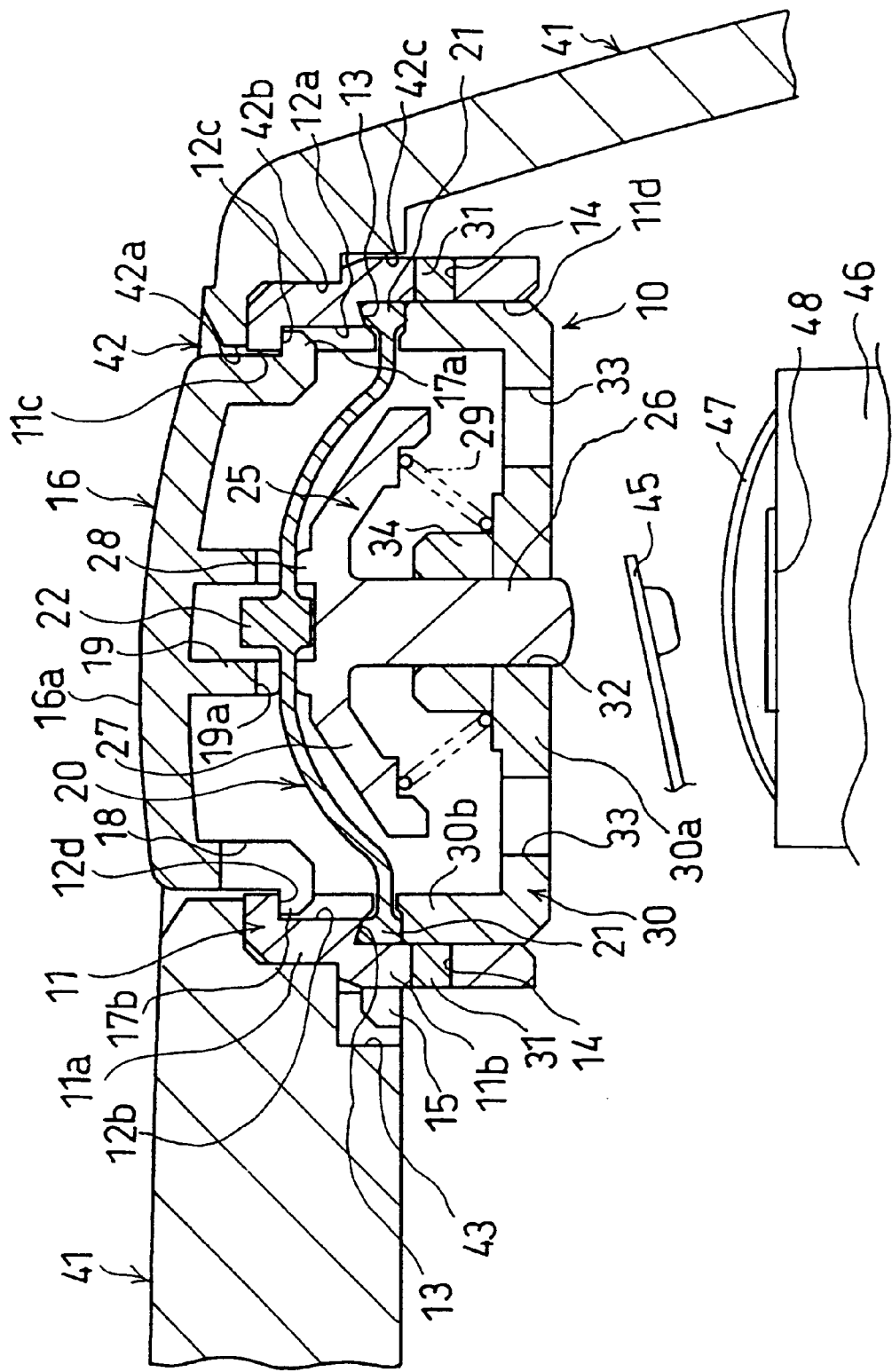
FIG. 2 is a cross-sectional view of a water-resistant push button switch which includes the water-resistant push button unit shown in FIG. 1 in a non-operational state.
Figure 3:
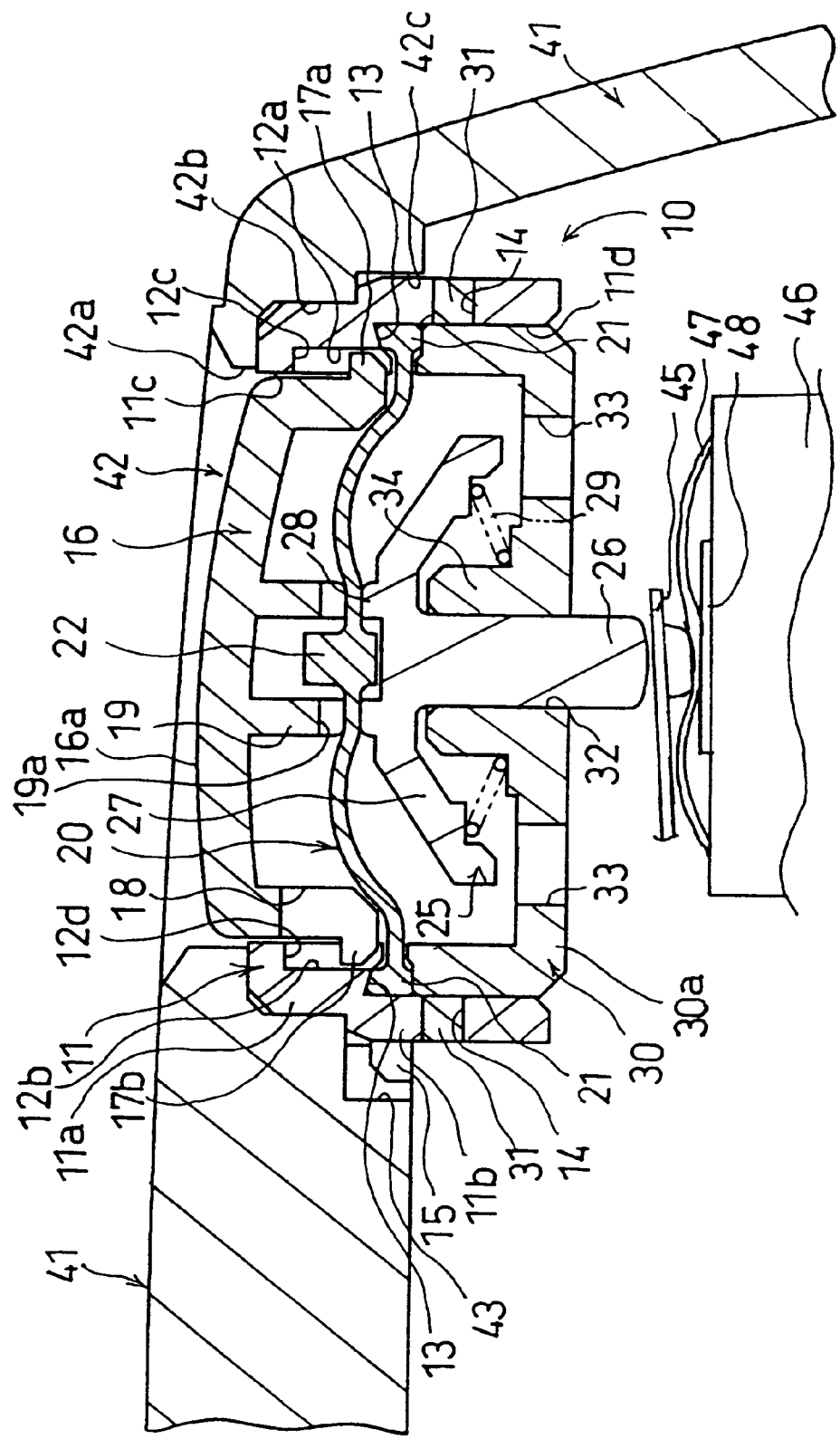
FIG. 3 is a cross-sectional view of the water-resistant push button switch shown in FIG. 2 in a fully depressed state.

The present invention is described below in detail with reference to the accompanying drawings. FIGS. 1 through 3 show the first embodiment of a water-resistant push button switch to which the present embodiment is applied. FIG. 1 shows the fundamental elements of a water-resistant push button unit 10 which is to be incorporated with the body of a water-resistant camera. The fundamental elements include a base member 11, an operational member 16, a water-resistant diaphragm (water-resistant member) 20, an intermediate member 25, a compression spring 29 and a holding member 30 which are coaxially arranged. The vertical direction of FIG. 1 corresponds to the vertical direction of the assembled water-resistant camera. The water-resistant push button unit 10 is assembled in a state where all the elements shown in FIG. 1 are inverted.

The base member 11 has a cylindrical shape and is provided with an upper cylindrical portion 11a and a lower cylindrical portion 11b. The inner diameter of the upper cylindrical portion 11a is smaller than the inner diameter of the lower cylindrical portion 11b. An upper opening 11c and a lower opening 11d are formed at the upper end of the upper cylindrical portion 11a and the lower end of the lower cylindrical portion 11b, respectively. The inner peripheral surface of the upper cylindrical portion 11a is provided thereon with a couple of guide grooves 12a and 12b each extending in the axial direction of the base member 11. Each of the guide grooves 12a and 12b does not extend to reach the upper edge of the upper cylindrical portion 11a, and the guide grooves 12a and 12b are provided at the upper ends thereof with stop surfaces 12c and 12d, respectively. In FIG. 1 the guide groove 12b cannot be seen. The guide groove 12b is formed to have a greater circumferential width than the guide groove 12a.

The base member 11 is provided, on an inner peripheral surface thereof between the upper and lower cylindrical portions 11a and 11b, with an annular stepped portion 9 (see FIG. 1) which is formed by a difference in inner diameter between the upper and lower cylindrical portions 11a and 11b. The stepped portion 9 is provided with an inclined annular surface 13 which is inclined with respect to the axial direction of the base member 11. The inclined annular surface 13 is inclined in a direction to come near to the upper opening 11c as a point on the inclined annular surface 13 moves outwardly in radial direction of the base member 11.

The lower cylindrical portion 11b is provided, on the inner peripheral surface thereof below the inclined annular surface 13, with four L-shaped slots 14 which are arranged substantially at regular intervals in a circumferential direction of the base member 11. One end portion (open end portion) of each L-shaped slot 14 extends in the axial direction of the base member 11 to the lower opening 11d, while the other end portion (closed end portion) of each L-shaped slot 14 extends in a circumferential direction of the base member 11 to thereby form the L-shape thereof. The closed end of each slot 14 is provided with a slight step stepped in the axial direction of the base member 11 so that the holding member 30 can be stably held by the base member 11 via the L-shaped slots 14 and engaging projections 31 which are respectively engaged with the L-shaped slots 14, without any play therebetween. The base member 11 is provided on an outer peripheral surface thereof with a positioning projection 15 for determining the position of the base member 11 with respect to an exterior wall (body wall) 41 of the camera body.

The operational member 16 is supported by the base member 11 and is positioned inside the base member 11 with a pressing surface 16a being externally exposed. The operational member 16 is provided with first and second engaging projections 17a and 17b which extend radially and outwardly in the opposite directions. The first and second engaging projections 17a and 17b are slidably engaged with the guide grooves 12a and 12b in the axial direction of the base member 11, respectively.

The outer diameter of the operational member 16 corresponds to the inner diameter of the upper cylindrical portion h1a of the base member 11, so that the operational member 16 can be inserted in the base member 11 from the lower opening 11d, with the engaging projections 17a and 17b being fitted in the guide grooves 12a and 12b, respectively. The operational member 16 can move in the axial direction of the base member 11 with respect to the base member 11 (the upper cylindrical member 11a) while the engaging projections 17a and 17b are guided by the guide grooves 12a and 12b, but the operational member 16 cannot move beyond a predetermined position with respect to the base member 11 which is determined by the aforementioned stop surfaces 12c and 12d respectively formed on the guide grooves 12a and 12b.

The second engaging projection 17b is provided with a slit 18 which extends in the axial direction of the operational member 16. In the state shown in FIG. 2 where the operational member 16 is not depressed, the upper portion of the slit 18 is positioned on an outer side of the upper opening 11c of the base member 11 wherein the slit 18 is connected to the outside of the camera body, so that fluid such as air and water can flow into and out of the upper cylindrical portion 11a through the slit 18. The operational member 16 is provided, on a lower surface at the approximate center thereof, with an annular projection 19 which extends towards the water-resistant diaphragm 20 in the axial direction of the operational member 16. The annular projection 19 is provided with a couple of slits 19a through which fluid can come into and out of the inner space of the annular projection 19.

The water-resistant diaphragm 20 is made of a watertight elastic material such as rubber. The water-resistant diaphragm 20 is provided at an approximate center thereof with a central shaft 22 which extends in the axial direction of the water-resistant diaphragm 20. The ends of the central shaft 22 extend in opposite directions towards the operational member 16 and the intermediate member 25. The water-resistant diaphragm 20 is formed to have a dome shape which bulges towards the operational member 16 around the central shaft 22. The water-resistant diaphragm 20 is provided around the rim (circumferential edge) thereof with a bead portion 21 that is thicker than an inner portion of the water-resistant diaphragm 20.

The water-resistant diaphragm 20 is inserted in the base member 11 from the lower opening lid towards the operational member 16 with the bulged surface of the diaphragm 20 facing the operational member 16, after the operational member 16 has been inserted in the base member 11. The outer diameter of the water-resistant diaphragm 20 corresponds to the inner diameter of the lower cylindrical portion 11b, so that the water-resistant diaphragm 20 cannot further move towards the operational member 16 once the water-resistant diaphragm 20 is inserted in the base member 11 up to a position where the bead portion 21 contacts the inclined annular surface 13. In a state where the bead portion 21 contacts the inclined annular surface 13, one end (the upper end as viewed in FIG. 2) of the central shaft 22 of the water-resistant diaphragm 20 is positioned in the annular projection 19 of the operational member 16.

The intermediate member 25 is provided with a cap portion 27 and a cylindrical shaft portion 26 which extends from the approximate center of the cap portion 27 in the axial direction of the intermediate member 25 apart from the operational member 16. The intermediate member 25 is provided, at the center of an upper surface thereof which i faces the water-resistant diaphragm 20, with an annular projection 28 which has a circular opening at the top thereof. The annular projection 28 is formed such that the annular shape of the face of the annular projection 28 corresponds to the face of the annular projection 19 of the operational member 16.

The holding member 30 is provided with a circular bottom wall 30a and a cylindrical side wall 30b which is connected to one end (bottom end as viewed in FIG. 2) of the circular bottom wall 30a. The outer diameter of the cylindrical side wall 30b corresponds to the inner diameter of the lower cylindrical portion lib of the base member 11. The lower opening lid is closed when the holding member 30 is fitted in the base member 11. The holding member 30 is provided around the side wall 30b with four engaging projections 31 each projecting outwardly in a radial direction of the holding member 30. The four engaging projections 31 are arranged around the side wall 30b substantially at regular intervals. The engaging projections 31 can be engaged with the L-shaped slots 14 of the base member 11, respectively. The holding member 30 is provided, on an inner surface of the circular bottom wall 30a at the approximate center thereof, with a cylindrical portion 34 which extends in the axial direction of the holding member 30 towards the upper opening 11c of the base member 11. The holding member 30 is further provided at the center thereof with a guide opening 32 which extends through the axial center of the cylindrical portion 34. The shaft portion 26 of the intermediate member 25 is slidably inserted in the guide opening 32 to be movable in the axial direction of the shaft portion 26 with respect to the holding member 30. The holding member 30 is further provided on the bottom wall 30a with a couple of through holes 33.

The base member 11 and the holding member 30 are assembled by firstly inserting the shaft portion 26 of the intermediate member 25 in the guide opening 32 of the holding member 30 and thereafter engaging the engaging projections 31 with the L-shaped slots 14, with a coil spring (compression spring) 29 being positioned between the cap portion 27 of the intermediate member 25 and the bottom wall 30a of the holding member 30. The coil spring 29 has a large diameter end and a small diameter end, as can be seen from FIG. 1. The coil spring 29 is positioned between the cap portion 27 and the bottom wall 30a with the large and small diameter ends contacting the cap portion 27 and the bottom wall 30a, respectively.

The holding member 30 is fixed to the base member 11 by the engagement of the four engaging projections 31 with the L-shaped slots 14. In this fixing operation, the engaging projections 31 are respectively inserted in the L-shaped slots 14 in the axial direction of the holding member 30 until each engaging projection 31 abuts against the bottom (the upper end of the vertical part of each L-shaped slot 14) of the corresponding L-shaped slot 14. Subsequently, the holding member 30 is rotated around its axis with respect to the base member 11 so that each engaging projection 31 slides along the circumferentially-elongated part of the corresponding L-shaped slot 14. Each engaging projection 31 is tightly engaged with the corresponding L shaped slots 14 without any play therebetween when the holding member 30 is rotated about the axis thereof with respect to the base member 11 until each engaging projection 31 reaches the aforementioned step formed at the closed end of each L-shaped slot 14.

When the holding member 30 is fixed to the base member 11 in the aforementioned manner, the bead portion 21 of the water-resistant diaphragm 20 is tightly held between the inclined annular surface 13 and an annular upper end surface of the cylindrical side wall 30b of the holding member 30 so that the bead portion 21 is compressed in the axial direction of the base member 11. Hence, the bead portion 21 is radially deformed to thereby come into pressing contact with the inner peripheral surface of the lower cylindrical portion 11b. Consequently, the inner space of the base member 11 is completely separate from the inner space of the holding member 30 via the water-resistant diaphragm 20 in a water-tight fashion. Since either one of the upper and lower pressing surfaces (the inclined annular surface 13 of the base member 11 in the present embodiment) which come into pressing contact with the bead portion 21 is formed as an inclined surface which is inclined in a direction apart from the other pressing surface (the annular upper end surface of the cylindrical side wall 30b of the holding member 30 in the present embodiment) as a point on the inclined surface moves outwardly in a radial direction of the base member 11, the bead portion 21 can be easily deformed in a direction to contact the inner peripheral surface of the base member 11. Due to this structure, the watertight connection between the bead portion 21 of the water-resistant diaphragm 20 and the inner peripheral surface of the base member 11 is improved.

At the same time, when the holding member 30 is fixed to the base member 11 in the aforementioned manner, part of the water-resistant diaphragm 20 around the central shaft 22 is held between the annular projection 19 of the operational member 16 and the annular projection 28 of the intermediate member 25, with one end (lower end as viewed in FIG. 2) of the central shaft 22 of the water-resistant diaphragm 20 being positioned in the circular opening of the annular projection 28 of the intermediate member 25. With this structure, the operational member 16 and the intermediate member 25 can move together in the axial direction of the base member 11 via the water-resistant diaphragm 20. When the base member 11 and the holding member 30 are put together, the coil spring 29 is compressed between the cap portion 27 of the intermediate member 25 and the bottom wall 30a of the holding member 30, so that the intermediate member 25 is continuously pressed against the water-resistant diaphragm 20 towards the operational member 16 by the spring force of the coil spring 29. Due to this spring force which presses the intermediate member 25 against the water-resistant diaphragm 20, the operational member 16, which moves together with the intermediate member 25, is continuously pressed upwards as viewed in FIG. 2 to be positioned at a maximum projecting position (uppermost position) where the engaging projections 17a and 17b contact the stop surfaces 12c and 12d of the guide grooves 12a and 12b, respectively.

When the holding member 30 is fixed to the base member 11, a special tool (not shown) provided with a couple of pins for inserting into the through holes 33 of the holding member 30 can be used. The through holes 33 also function as air ventilation holes when the operational member 16 is operated.

As mentioned above, the water-resistant push button unit 10 is assembled in a state wherein all the elements shown in FIG. 1 are inverted. The reason why the water-resistant push button unit 10 is assembled in such a manner will be hereinafter discussed. The operational member 16 can be inserted in the base member 11 but cannot drop out of the base member 11 from the upper opening 11c, so that the operational member 16, the water-resistant diaphragm 20, the intermediate member 25, the coil spring 29 and the holding member 30 can be easily put in the base member 11 in this order without any danger of dropping these elements out of the base member 11 during assembly if the operational member 16 is firstly put in the base member 11. This facilitates the assembly of the water-resistant push button unit 10. No adhesive is used for assembling the water-resistant push button unit 10, and no element of the water-resistant push button unit 10 drops out of the base member 11 even if water-resistant push button unit 10 is inverted once the water-resistant push button unit 10 is assembled, so that the water-resistant push button unit 10 can be easily handled.

The exterior wall 41 of the camera body is provided with a circular opening 42 to which the water-resistant pushbutton unit 10 is fixed. The inner peripheral surface of the opening 42 is formed as a stepped surface to form three inner peripheral surfaces having different diameters, i.e., first, second and third cylindrical surfaces 42a, 42b and 42c, respectively. The first cylindrical surface 42a is closest to the outside of the camera body and has the smallest diameter thereof. The third cylindrical surface 42c is closest to the inside of the camera body and has the largest diameter thereof. The second cylindrical surface 42b is positioned between the first and second cylindrical surfaces 42a and 42c and has a medium diameter with respect to the cylindrical surfaces 42a and 42c. The diameter of the first cylindrical surface 42a is larger than the outer diameter of the operational member 16, so that the operational member 16 can move in the axial direction thereof without being interfered by the first cylindrical surface 42a. The diameter of the second cylindrical surface 42b corresponds to the outer diameter of the upper cylindrical portion 11a of the base member 11, while the diameter of the third cylindrical surface 42c corresponds to the outer diameter of the lower cylindrical portion 11b of the base member 11. The third cylindrical surface 42c is provided with a recessed portion 43 in which the positioning projection 15 formed on the base member 11 is fitted.

The water-resistant push button unit 10 is fixed to the opening 42 from the inside of the exterior wall 41 with the pressing surface 16a of the operational member 16 being externally exposed. Since the opening 42 has a three-step-peripheral surface as mentioned before, the axial position of the water-resistant push button unit 10 with respect to the opening 42 is determined at a predetermined fixed position. Specifically, the water-resistant push button unit 10 can be inserted in the opening 42 to a position where the upper and lower cylindrical portions 11a and 11b abut against an upper annular surface of the exterior wall 41 which connects the first cylindrical surface 42a with the second cylindrical surface 42b and a lower annular surface of the exterior wall 41 which connects the second cylindrical surfaces 42b with the third cylindrical surface 42c, respectively. The angular position of the water-resistant push button unit 10 relative to the opening 42 is determined by the recessed portion 43 and the positioning projection 15 which is fitted in the recessed portion 43. The water-resistant push button unit 10 is secured to the exterior wall 41 in the opening 42 by a water-resistant adhesive (not shown) which prevents water from coming into the camera body through a gap between the opening 42 and the base member 11.

A spring-contact switch 45 is positioned within the camera body below the water-resistant push button unit 10. A switch supporting member 46 is positioned below the spring-contact switch 45. A release switch plate 48 and an arch-shaped photometering switch plate 47 positioned above the release switch plate 48 are provided on the switch supporting member 46. The spring-contact switch 45, the photometering switch plate 47 and the release switch plate 48 are all aligned on the axis of the shaft portion 26 of the intermediate member 25. The spring-contact switch 45, the photometering switch plate 47 and the release switch plate 48 together constitute a conventional two-step switch. Namely, the first switch (photometering switch) is turned ON when the spring-contact switch 45 is depressed to contact the photometering switch plate 47, and the second switch (shutter-release switch) is turned ON when the spring-contact switch 45 is further depressed to bring the photometering switch plate 47 into contact with the release switch plate 48. The spring-contact switch 45 has a predetermined elasticity and is positioned above the photometering switch plate 47 in a free state as shown in FIG. 2. Likewise, the photometering switch plate 47 has a predetermined elasticity and is positioned above the release switch plate 48 separate from both the spring-contact switch 45 and the release switch plate 48 in a free state as shown in FIG. 2.

In the state where the water-resistant push button unit 10 is properly secured to the exterior wall 41 as shown in FIG. 2, water is prevented from entering the camera body through the water-resistant diaphragm 20; however, water is allowed to enter the space (non-watertight space) defined between the operational member 16 and the water-resistant diaphragm 20. The water which enters the non-watertight space can be discharged through the slit 18 as mentioned before, but the amount of water which enters the non-watertight space is preferably as little as possible. Hence, the water-resistant diaphragm 20 is formed to have a dome shape which bulges towards the operational member 16 around the central shaft 22, thereby the non-watertight space (i.e., the amount of water which enters the non-watertight space) is successfully made smaller, as compared with the case where the water-resistant diaphragm 20 is formed as a flat diaphragm. Furthermore, since the couple of slits 19a are formed on the annular projection 19 of the operational member 16, water that enters the space in the annular projection 19 can also be discharged.

The water-resistant push button unit 10, the spring-contact switch 45, the photometering switch plate 47 and the release switch plate 48 constitute the water-resistant push button switch.

The operation of the water-resistant push button unit 10 will be hereinafter discussed. In the state where the operational member 16 is not depressed at all, the intermediate member 25 is maintained to be positioned by the spring force of the coil spring 29 so that greater part of the cylindrical shaft portion 26 is positioned within the water-resistant push button unit 10 as can be seen in FIG. 2. In this state, the operational member 16 is maintained to be positioned by the spring force of the coil spring 29 via the water-resistant diaphragm 20 so that the pressing surface 16a slightly projects from the outer surface of the exterior wall 41. Beyond this position the operational member 16 cannot move upward as mentioned above.

In the state shown in FIG. 2, manually depressing the operational member 16 causes the intermediate member 25 to move downwards as viewed in FIG. 2 via the water-resistant diaphragm 20 while compressing the coil spring 29. At the same time the cylindrical shaft portion 26 of the intermediate member 25 moves downward in the axial direction thereof while being guided by the guide opening 32. At this moment part of the water-resistant diaphragm 20 around the central shaft 22 is deformed to bulge downwardly. When the cylindrical shaft portion 26 moves by a predetermined distance downwards, the lower end of the cylindrical shaft portion 26 presses the spring-contact switch 45 downwards to bring the same into pressing contact with the photometering switch plate 47, which turns ON the photometering switch of the camera. At this moment the user of the camera can perceive that the photometering switch of the camera is turned ON by feeling a click action generated by the photometering switch plate 47.

Further depressing the operational member 16 causes the intermediate member 25 to move downward further while further compressing the coil spring 29, which also makes the cylindrical shaft portion 26 move downward further. When the operational member 16 is fully depressed as shown in Figure 3, the cylindrical shaft portion 26 of the intermediate member 25 presses the spring-contact switch 45 and the photometering -switch plate 47 against the release switch plate 48, thereby the release switch of the camera is turned ON.

In the state where either the photometering switch or the release switch is turned ON, releasing a pressing force applied to the operational member 16 causes the coil spring 29 to return to its original state, so that the operational member 16 and the intermediate member 25 are returned to their initial positions shown in FIG. 2. Consequently, the spring-contact switch 45 and the photometering switch plate 47 also return to their original positions, thereby both the photometering switch and release switch are turned OFF.

The volume of the non-watertight space defined between the operational member 16 and the water-resistant diaphragm 20 and also the volume of the watertight space defined between the water-resistant diaphragm 20 and the holding member 30 each vary in accordance with the pressing operation of the operational member 16. Since the slit 18 is formed on the operational member 16, the volume of air in the non-watertight space is adjusted through the slit 18 when the operational member 16 moves in the axial direction thereof. Water which may enter the non-watertight space can also be discharged through the slit 18. On the other hand, since the couple of through holes 33 are formed on the holding member 30, the volume of air in the aforementioned watertight space defined between the water-resistant diaphragm 20 and the holding member 30 is also adjusted through the through holes 33 when the volume of the watertight space varies in accordance with the deformation of the water-resistant diaphragm 20. Therefore, when the user of the camera depresses the operational member 16, the operational member 16 smoothly moves in the axial direction thereof without being substantially influenced by fluid force or resistance. As a result, the operational member 16 can be operated smoothly by the user.

Since the central shaft 22 of the water-resistant diaphragm 20 is held between the annular projection 19 of the operational member 16 and the annular projection 28 of the intermediate member 25 to be positioned inside the base member 11, the water-resistant diaphragm 20 is not substantially displaced radially when the operational member 16 is depressed, so that the water-resistant diaphragm 20 is stably held in place.

In the present embodiment of the water-resistant push button switch, the water-resistant diaphragm 20 is positioned within the camera body below the operational member 16, and no rubber sheet is attached to the top and around the operational member 16 to cover the same. Therefore, there is little chance that the water-resistant diaphragm 20 is scratched or damaged, which makes it possible to form a thin water-resistant diaphragm 20. This improves the click touch which is perceived by the user when he or she depresses the operational member 16. The water-resistant diaphragm 20 is positioned in the water-resistant push button unit 10 without the use of an adhesive, the aforementioned conventional problem that a rubber sheet for covering the push button switch may possibly peel off at an adhesive part thereof as a result of a long period of use of the push button switch will never occur. Moreover, there is no need to worry about the aforementioned problem of adhesive protrusion.

In the present embodiment, the water-resistant push button of the camera is constructed as a unit (i.e., the water-resistant push button unit 10) which is secured to the exterior wall 41. This structure realizes an easy assembly of the water-resistant push button switch. The water-resistant push button unit 10 can also be easily assembled as can be understood from the foregoing.

Figure 4:
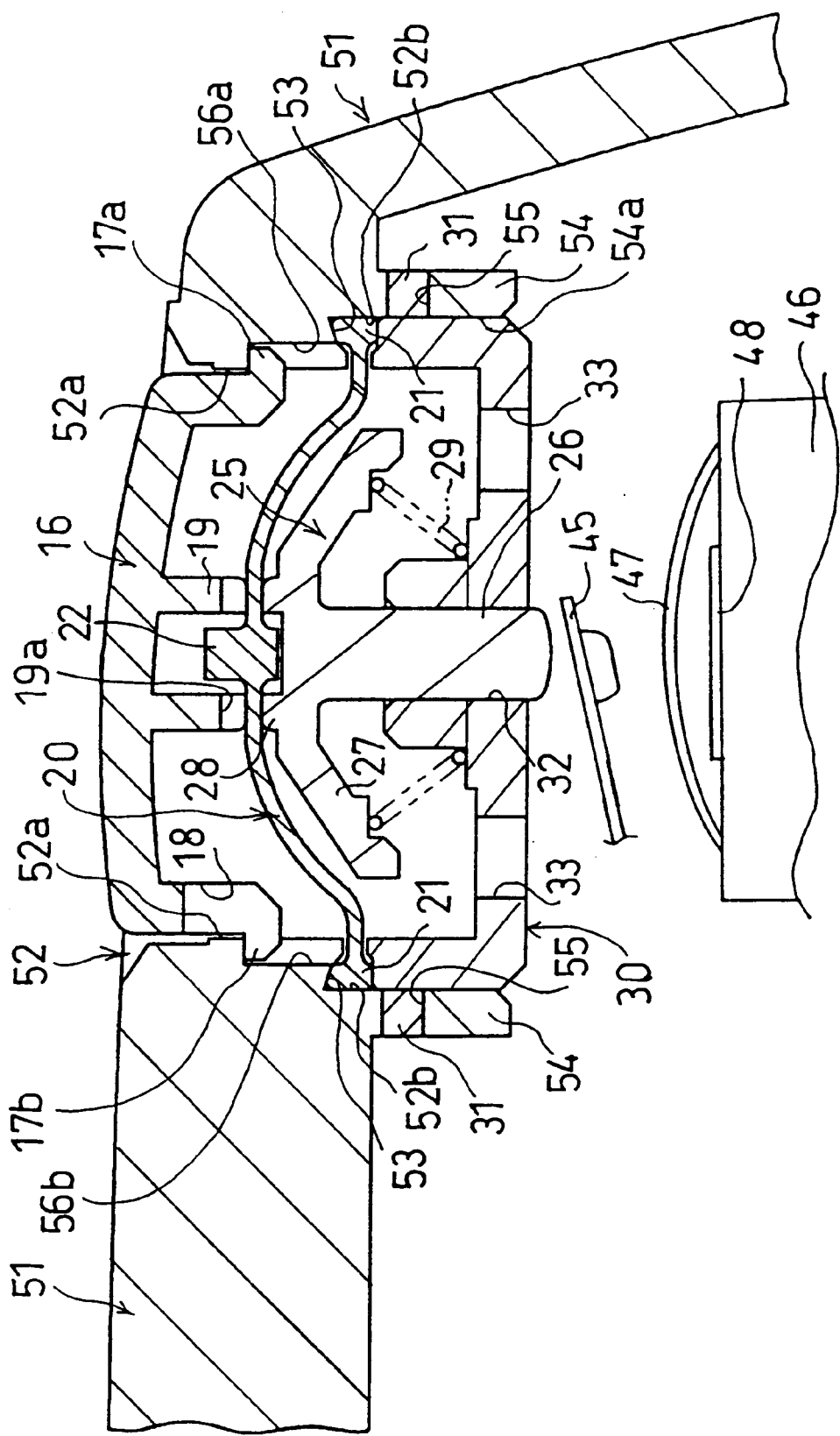
FIG. 4 is a cross-sectional view of a water-resistant push button switch of another embodiment in a non-operational state.
Figure 5:
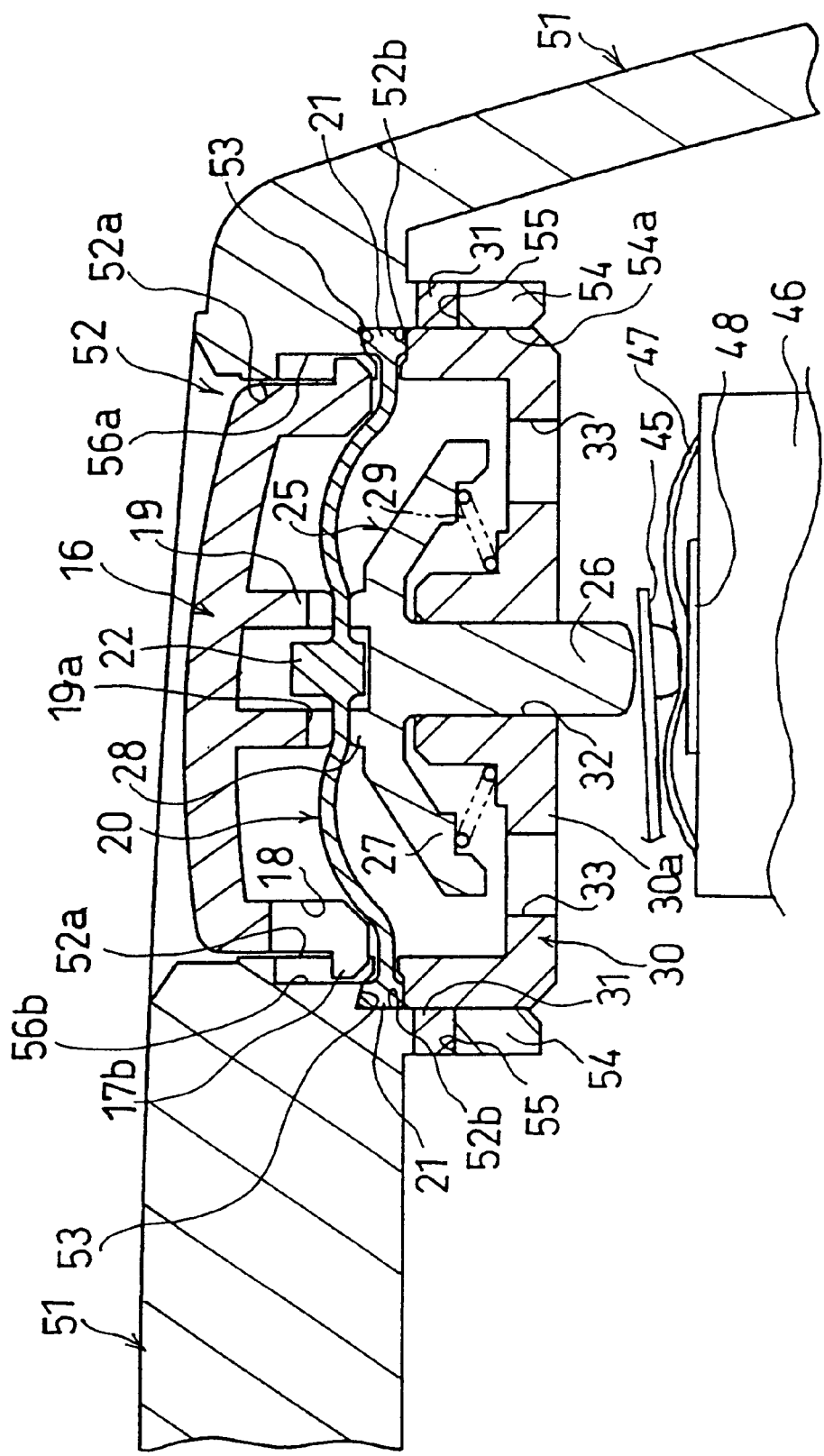
FIG. 5 is a cross-sectional view of the water-resistant push button switch shown in FIG. 4 in a fully depressed state.

FIGS. 4 and 5 show another embodiment (second embodiment) of the water-resistant push button switch. In this second embodiment, a base member which corresponds to the base member 11 in the first embodiment is formed integral with an exterior wall (body wall) 51 of the camera body. Except for this modification the first and second embodiments are identical. In the second embodiment elements or parts similar to those in the first embodiment are designated by the same reference numerals.

The exterior wall 51 of the camera body is provided with a circular opening 52. The inner peripheral surface of the opening 52 is provided with an upper cylindrical surface 52a and a lower cylindrical surface 52b. The operational member 16 can be slidably fitted in the upper cylindrical surface 52a. The upper cylindrical surface 52a has a smaller diameter than lower cylindrical surface 52b. The outer end of the upper cylindrical surface 52a is positioned outside the exterior wall 51. The exterior wall 51 is provided, on an inner peripheral surface of the opening 52 between the upper and lower cylindrical surfaces 52a and 52b, with a circular stepped portion (similar to the circular stepped portion 9 in the first embodiment) which is formed by a difference in inner diameter between the upper and lower cylindrical surfaces 52a and 52b. The stepped portion is provided with an inclined annular surface 53 which is inclined with respect to the axial direction of the opening 52. The inclined annular surface 53 is inclined in a direction to come near to the outer end of the opening 52 as a point on the inclined annular surface 53 moves outwardly in radial direction of the opening 52.

The exterior wall 51 is provided around the inner end of the opening 52 with an annular rib 54 which extends inwardly in the axial direction of the opening 52. The annular rib 54 is provided with an inner cylindrical surface which is connected to be flush with the inner peripheral surface of the lower cylindrical surface 52b. The lower end of the annular rib 54 forms a circular opening 54a. The annular rib 54 is provided with four L-shaped slots 55 which are arranged substantially at regular intervals in a circumferential direction of the annular rib 54. In FIGS. 4 and 5 only two of the four L-shaped slots 55 can be seen. The L-shaped slots 55 are similar to the L-shaped slots 14 in the first embodiment. Therefore, one end portion (open end portion) of each L-shaped slot 55 extends in the axial direction of the annular rib 54 to be connected with the opening 54a, while the other end portion (closed end portion) of each L-shaped slot 55 extends in a circumferential direction of the annular rib 54 to thereby form the L-shape of the L-shaped slot 55. The closed end of each slot 55 is provided with a slight step stepped in the axial direction of the annular rib 54, similar to each L shaped slot 14 in the first embodiment.

The upper cylindrical surface 52a is provided thereon with a couple of guide grooves 56a and 56b each extending in the axial direction of the opening 52. The first and second engaging projections 17a and 17b of the operational member 16 are slidably engaged with the guide grooves 56a and 56b, respectively, in the axial direction of the opening 52. The outer diameter of the water-resistant diaphragm 20 corresponds to the inner diameter of the lower cylindrical surface 52b, and the water-resistant diaphragm 20 is held between the exterior wall 51 and the holding member 30 with the bead portion 21 contacting the inclined annular surface 53. The holding member 30 on which the intermediate member 25 and the coil spring 29 are set is fitted into the annular rib 54. The holding member 30 is fixed to the annular rib 54 so that the engaging projections 31 of the holding member 30 (only two of the four engaging projections 31 can be seen in FIGS. 4 and 5) are respectively engaged with the L shaped slots 55. When the holding member 30 is fixed to the annular rib 54, a special tool (not shown) provided with a couple of pins for inserting into the through holes 33 of the holding member 30 can be used.

When the holding member 30 is fixed to the annular rib 54 in the aforementioned manner, the bead portion 21 of the water-resistant diaphragm 20 is tightly held between the inclined annular surface 53 and the annular upper end surface of the holding member 30 so that the bead portion 21 is compressed in the axial direction of the annular rib 54. Hence, the bead portion 21 is radially deformed to thereby give firm contact with the inner peripheral surface of the lower cylindrical surface 52b. Consequently, the opening 52 is closed by the water-resistant diaphragm 20 in a watertight fashion so that water cannot enter the inner space of the camera body through the opening 52.

In the second embodiment of the water-resistant push button switch, in order to fix the holding member 30 to the exterior wall 51, the engaging projections 31 of the holding member 30 are respectively engaged with the L-shaped slots 55 formed on the exterior wall 51. Instead of using the engaging projections 31 and the L-shaped slots 55, the holding member 30 can be fixed to the exterior wall 51 by forming a female screw thread on the inner peripheral surface of the annular rib 54 and a corresponding male screw thread on the outer peripheral surface of the holding member 30 and by engaging the male screw thread with the female screw thread. Such a structure using the male and female screw threads can also be applied to the first embodiment. In this modified case, the holding member 30 can be fixed to the base member 11 by forming a female screw thread on the inner peripheral surface of the lower cylindrical portion 11b of the base member 11 and a corresponding male screw thread on the outer peripheral surface of the holding member 30 and by engaging the male screw thread with the female screw thread.

Although each of the first and second embodiments relates to a water-resistant push button switch of a water-resistant camera, the water-resistant push button switch can be utilized in any other water-resistant apparatuses. In each of the first and second embodiments the water-resistant push button switch is constructed as a two-step switch; however, a single-step switch construction is also possible. In the first embodiment, instead of forming the inclined annular surface 13 on the base member 11, an inclined annular surface which corresponds to the inclined annular surface 13 can be formed on the annular upper end surface of the holding member 30. Likewise, in the second embodiment, instead of forming the inclined annular surface 53 on the exterior wall 51, an inclined annular surface which corresponds to the inclined annular surface 53 can be formed on the annular upper end surface of the holding member 30. In each of the first and second embodiments, although the holding member 30 is provided on the bottom wall 30a with a couple of through holes 33, only one through hole 33 or more than two through holes 33 can be formed on the bottom wall 30a.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A water-resistant push button switch of a water-resistant apparatus, comprising:
    an opening formed on a body wall of said water-resistant apparatus;
    a water-resistant elastic member for preventing water from entering inside said water-resistant apparatus through said opening;
    an operational member positioned on an outer side of said water-resistant elastic member so as to be movable with respect to said body wall;
    an intermediate member positioned on an inner side of said water-resistant elastic member so as to be movable with respect to said body wall, said intermediate member being pressed by said operational member via said water-resistant elastic member when said operational member is depressed; and
    a switch which is operated by being pressed by said intermediate member via said water-resistant elastic member upon said operational member being pressed, said water-resistant elastic member, said operational member and said intermediate member all being positioned in said opening and supported on said body wall by a cylindrical base provided separate from said body wall.

2. The water-resistant push button switch according to claim 1, wherein said operational member comprises a slot through which water can enter and be discharged from a space defined between said operational member and said water-resistant elastic member.

3. The water-resistant push button switch according to claim 1, wherein said base member comprises a stepped portion formed on an inner peripheral surface of said base member, a circumferential edge of said water-resistant elastic member being positioned on said stepped portion.

4. The water-resistant push button switch according to claim 3, further comprising a holding member fixed to said base member with said circumferential edge of said water-resistant elastic member being held between said stepped portion of said base member and said holding member.

5. The water-resistant push button switch according to claim 4, wherein said holding member comprises a cylindrical outer peripheral surface which corresponds to a cylindrical inner peripheral surface of said base member so that said holding member is fitted into said base member when said holding member is fixed to said base member.

6. The water-resistant push button switch according to claim 4, wherein said stepped portion comprises an inclined annular surface which is inclined with respect to an axial direction of said base member.

7. The water-resistant push button switch according to claim 6, wherein said inclined annular surface is inclined in a deforming direction of said circumferential edge of said water-resistant elastic member to thereby bring said circumferential edge into pressing contact with an inner peripheral surface of said base member when said circumferential edge is held between said inclined annular surface and said holding member.

8. The water-resistant push button switch according to claim 4, wherein said holding member comprises an inclined annular surface which is inclined with respect to an axial direction of said base member.

9. The water-resistant push button switch according to claim 8, wherein said inclined annular surface is inclined in a deforming direction of said circumferential edge of said water-resistant elastic member to thereby bring said circumferential edge against into pressing contact with an inner peripheral surface of said base member when said circumferential edge is held between said inclined annular surface and said holding member.

10. The water-resistant push button switch according to claim 4, wherein said holding member comprises a cylindrical wall provided with a plurality of engaging projections which project radially from an outer peripheral surface of said cylindrical wall, an outer diameter of said cylindrical wall corresponding to an inner diameter of said cylindrical base member, and
    wherein said base member comprises a cylindrical wall provided with a plurality of slots with which said plurality of engaging projections are respectively engaged when said holding member is fixed to said base member.

11. The water-resistant push button switch according to claim 10, wherein said plurality of slots are each substantially L-shaped.

12. The water-resistant push button switch according to claim 4, wherein said holding member comprises a cylindrical wall provided on an outer peripheral surface thereof with a male screw thread, an outer diameter of said cylindrical wall corresponding to an inner diameter of said cylindrical base member, and wherein said base member comprises a cylindrical wall provided on an inner peripheral surface thereof with a female screw thread which is engaged with said male screw thread when said holding member is fixed to said base member.

13. The water-resistant push button switch according to claim 1, wherein said base member, said water-resistant elastic member, said operational member and said intermediate member are assembled as a unit which is secured to said body wall to be positioned in said opening in a watertight fashion.

14. A water-resistant push button switch of a water-resistant apparatus, comprising:

an opening formed on a body wall of said water-resistant apparatus;

a water-resistant elastic member for preventing water from entering inside said water resistant apparatus through said opening, an inner peripheral surface of said opening comprising a step portion, a circumferential edge of said water-resistant elastic member being positioned on said step portion;

an operational member positioned on an outer side of said water-resistant elastic member so as to be movable with respect to said body wall, said water resistant elastic member and said operational member being positioned in said opening and supported directly by said body wall;

an intermediate member positioned on an inner side of water-resistant elastic member so as to be movable with respect to said body wall, said intermediate member being pressed by said operational member via said water-resistant elastic member when said operational member is depressed; and a switch which is operated by being pressed by said intermediate member via said water-resistant elastic member upon said operational member being pressed, a holding member fixed to said body wall with said circumferential edge of said water-resistant elastic member being held between said step portion and said holding member, said holding member comprising a cylindrical outer peripheral surface which corresponds to said inner peripheral surface of said opening, wherein said holding member is fitted in said opening when said holding member is fixed to said body wall.

15. The water-resistant push button switch according to claim 14, wherein said stepped portion comprises an inclined annular surface which is inclined with respect to an axial direction of said opening.

16. The water-resistant push button switch according to claim 15, wherein said inclined annular surface is inclined in a deforming direction of said circumferential edge of said water-resistant elastic member to thereby bring said circumferential edge into pressing contact with said inner peripheral surface of said opening when said circumferential edge is held between said inclined annular surface and said holding member.

17. The water-resistant push button switch according to claim 14, wherein said holding member comprises an inclined annular surface which is inclined with respect to an axial direction of said opening.

18. The water-resistant push button switch according to claim 17, wherein said inclined annular surface is inclined in a deforming direction of said circumferential edge of said water-resistant elastic member to thereby bring said i circumferential edge into pressing contact with said inner peripheral surface of said opening when said circumferential edge is held between said inclined annular surface and said holding member.

19. The water-resistant push button switch according to claim 14, wherein said holding member comprises a cylindrical wall provided with a plurality of engaging projections which project radially from an outer peripheral surface of said cylindrical wall, an outer diameter of said cylindrical wall corresponding to a diameter of said opening, and wherein said body wall comprises a plurality of slots with which said plurality of engaging projections are respectively engaged when said holding member is fixed to said body wall.

20. The water-resistant push button switch according to claim 19, wherein said plurality of slots are each substantially L-shaped.

21. The water-resistant push button switch according to claim 19, wherein said body wall comprises a cylindrical wall which is formed around said opening to extend inwardly, said plurality of slots being formed on said cylindrical wall.

22. The water-resistant push button switch according to claim 14, wherein said holding member comprises a cylindrical wall provided on an outer peripheral surface thereof with a male screw thread, an outer diameter of said cylindrical wall corresponding to a diameter of said opening, and wherein said body wall comprises a female screw thread formed on an inner peripheral surface of said opening, said male screw thread being engaged with said female screw thread when said holding member is fixed to said body wall.

23. The water-resistant push button switch according to claim 1, wherein said water-resistant elastic member comprises a circumferential edge which is thicker than an inner portion thereof.

24. The water-resistant push button switch according to claim 1, wherein said water-resistant elastic member is formed to have a dome shape which bulges towards said operational member when said operational member is not depressed.

25. The water-resistant push button switch according to claim 4, wherein said holding member comprises a side wall and a bottom wall connected to said side wall, and wherein said bottom wall comprises:

a guide opening in which a corresponding portion of said intermediate member is inserted to be guided in an axial direction of said guide opening; and at least one through hole for allowing air to come into and out of a space defined between said water-resistant elastic member and said bottom wall.

26. The water-resistant push button switch according to claim 25, wherein said at least one through hole comprises a plurality of through holes, a corresponding plurality of engaging projections formed on a tool being respectively inserted into said plurality of through holes when said holding member is fixed to said base member.

27. The water-resistant push button switch according to claim 1, wherein said water-resistant apparatus is a water-resistant camera, and wherein said switch comprises a release switch of said water-resistant camera.

28. The water-resistant push button switch according to claim 27, wherein said switch further comprises a photometering switch of said water-resistant camera.

29. A water-resistant push button switch of a water-resistant apparatus, comprising:

an opening formed on a body wall of said water-resistant apparatus;

an operational member positioned in said opening to be movable in an axial direction of said opening with respect to said body wall;

an intermediate member positioned below said operational member to be movable in said axial direction of said opening with respect to said body wall;

a water-resistant diaphragm positioned between said operational member and said intermediate member, for preventing water from entering inside said water-resistant apparatus through said opening;

a switch is positioned in said water-resistant and apparatus operated by being pressed by said intermediate member via the water resistant diaphragm upon the operational member being pressed, wherein said operational member, said water-resistant diaphragm and said intermediate member are coaxially arranged so as to move together in said axial direction of said opening when said operational member is depressed, said water resistant elastic member, said operational member, and said intermediate member are all positioned in said opening and supported by said body wall via a cylindrical base member provided separately from said body wall.

* * * * *